(12) United States Patent
Trush et al.

(10) Patent No.: US 7,510,507 B2
(45) Date of Patent: Mar. 31, 2009

(54) TORQUE CONVERTER CLUTCH VIRTUAL ADAPT LEARN METHOD AND SYSTEM

(75) Inventors: Christopher J. Trush, Novi, MI (US);
Jean Sieffert, Lingolsheim (FR);
Vincent Holtz, Rosheim (FR)

(73) Assignee: GM Global Technology Operations, Inc., Detroit, MI (US)

( * ) Notice: Subject to any disclaimer, the term of this patent is extended or adjusted under 35 U.S.C. 154(b) by 424 days.

(21) Appl. No.: 11/496,973

(22) Filed: Aug. 1, 2006

(65) Prior Publication Data

US 2008/0032859 A1    Feb. 7, 2008

(51) Int. Cl.
*B60W 10/02*    (2006.01)
*F16H 45/02*    (2006.01)

(52) U.S. Cl. ...................... 477/180; 477/169
(58) Field of Classification Search .............. 477/70, 477/166, 168, 169, 174, 175, 180; 192/3.21, 192/3.33; 701/58, 59
See application file for complete search history.

(56) References Cited

U.S. PATENT DOCUMENTS 5,910,176 A * 6/1999 Creger .......................... 701/59
6,275,761 B1 * 8/2001 Ting ............................. 701/59
6,922,623 B2 * 7/2005 Rieger et al. ................ 701/67
2002/0065166 A1 * 5/2002 Jeon ............................. 477/70

FOREIGN PATENT DOCUMENTS

| DE | 19737413 | 3/1998 |
|---|---|---|
| DE | 19903554 | 8/2000 |
| DE | 69911547 | 7/2004 |
| JP | 62151662 | 7/1987 |

\* cited by examiner

Primary Examiner—Roger Pang

(57) ABSTRACT

A method of adapting a pressurized fluid supply to a torque converter clutch is provided. The method includes: learning a first pressure point related to an average of ramp pressure and an average of engine torque over a first time period; learning a second pressure point related to a second average of ramp pressure and a second average of engine torque over a second time period; determining a plurality of adapt values based on at least one of an extrapolation and an interpolation between the first pressure point and the second pressure point; and adapting the pressurized fluid to the torque converter clutch based on the plurality of adapt values.

21 Claims, 6 Drawing Sheets

TORQUE CONVERTER CLUTCH VIRTUAL ADAPT LEARN METHOD AND SYSTEM

FIELD

The present disclosure relates to methods and systems for controlling a torque converter clutch.

BACKGROUND

The statements in this section merely provide background information related to the present disclosure and may not constitute prior art.

Shifting and torque converter clutch lockup are adjusted by a controller based on data from input sensors and switches. The electronic system controls these operations using solenoid-operated valves. This control approach improves drivability. With electronic control, information about the engine, fuel, ignition, vacuum, and operating temperatures is used to ensure that shifting and converter lockup take place at the right time.

Many conventional control systems allow the controller to change the behavior of the transmission or torque converter in response to learned information such as typical operating conditions and habits of the driver. The system monitors the conditions of the engine and compensates for any changes in the engine's performance. The controller also monitors the typical driving style of the driver and adjusts the timing of shifts and converter lock-up to provide smooth shifting at the appropriate time. The electronic system is constantly learning about the vehicle and the driver. The controller adapts its normal operating procedures to best meet the needs of the vehicle and the driver. These electronic systems are said to have adaptive learning capabilities. To store this adaptive learning information, the controller may include long-term adaptive memory.

One form of adaptive learning strategy involves adapting a pressure value supplied to an electronically controlled converter clutch (ECCC). Conventional ECCC adapt systems learn adaptive pressure values over time based on engine torque conditions commanded by the driver. If the driver spends a considerable amount of time at low engine torque conditions, the adaptive values for higher engine torque conditions may not be learned at all. This creates a disparity in the adapted values that can adversely impact control of the TCC when transitioning from low to high engine torque conditions. The disparity has been corrected by a pressure value added to or subtracted from the adapt value to prevent over pressurization (lock) or under pressurization (flare).

SUMMARY

Accordingly, a method of adapting a pressurized fluid supply to a torque converter clutch is provided. The method includes: learning a first pressure point related to an average of ramp pressure and an average of engine torque over a first time period; learning a second pressure point related to a second average of ramp pressure and a second average of engine torque over a second time period; determining a plurality of adapt values based on at least one of an extrapolation and an interpolation between the first pressure point and the second pressure point; and adapting the pressurized fluid to the torque converter clutch based on the plurality of adapt values.

In other features, a torque converter clutch control system for a vehicle including an automatic transmission is provided. The control system includes: at least one valve that controls the flow of pressurized fluid to the torque converter. At least one solenoid controls a position of the at least one valve. A controller sends a signal to the solenoid based on a pressure value, wherein the pressure value is adapted based on an adapt value determined from first and second operating points that are learned by averaging ramp pressure and engine torque over a first and second time periods and a slope value calculated from the first and second operating points.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

Figure 1:
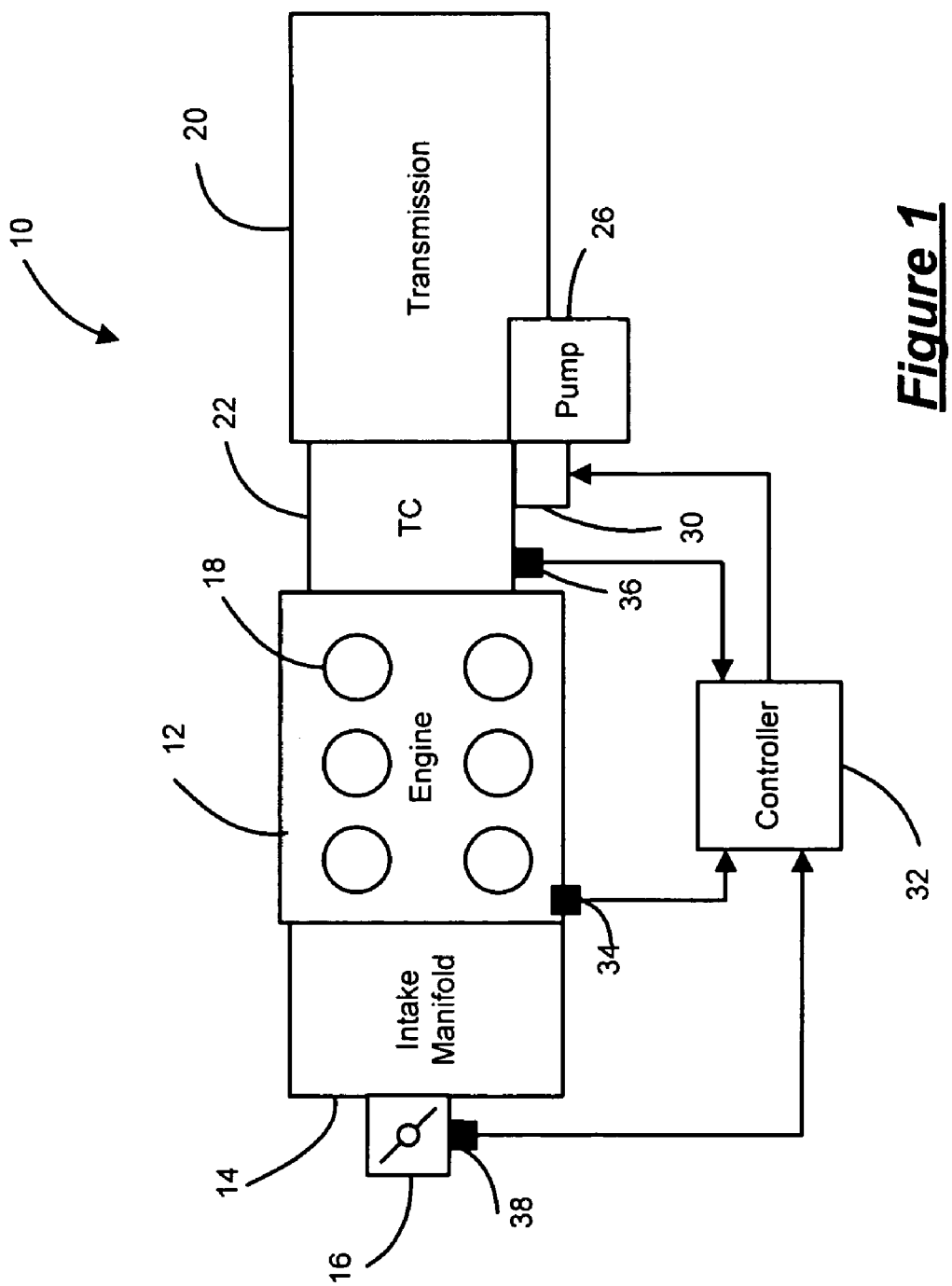
FIG. 1 is a functional block diagram of a vehicle including a conventional torque converter system.

The following description is merely exemplary in nature and is not intended to limit the present disclosure, application, or uses. It should be understood that throughout the drawings, corresponding reference numerals indicate like or corresponding parts and features. As used herein, the term module refers to an application specific integrated circuit (ASIC), an electronic circuit, a processor (shared, dedicated, or group) and memory that executes one or more software or firmware programs, a combinational logic circuit, and/or other suitable components that provide the described functionality.

FIG. 1 illustrates a vehicle 10 that includes a conventional torque converter system. An engine 12 combusts an air and fuel mixture to produce drive torque. Air is drawn into an intake manifold 14 through a throttle 16. The throttle 16 regulates mass air flow into the intake manifold 14. Air within the intake manifold 14 is distributed into cylinders 18. Although six cylinders 18 are illustrated, it can be appreciated that the engine can have a plurality of cylinders including, but not limited to, 2, 3, 5, 6, 8, 10, 12 and 16 cylinders.

Torque from the engine 12 is supplied to a transmission 20 through a torque converter (TC) 22. The transmission includes a hydraulic pump 26 that supplies fluid to and from the TC 22 via at least one solenoid-operated valve 30. The hydraulic pump 26 is driven by the engine 12. A current and/or pulse width modulated signal is commanded by a controller 32 to the solenoid in order to vary the supply of pressurized fluid to the torque converter 24. A slip rate of the torque converter 24 is varied based on control of the pressurized fluid.

The controller 32 determines the appropriate signal based on inputs received from the torque converter 24, the engine 12, and the transmission 20. The signal is determined by control modules within the controller 32. Control modules determine an estimated engine torque value based on received engine operating parameters. While other control modules determine the appropriate pressure ($P_{TCC}$) to be supplied to the torque converter 24 and command the signal accordingly. Inputs to the controller 32 may include: an engine speed signal received from an engine speed sensor 34; a turbine speed signal received from a turbine speed sensor 36; and a throttle position signal received from a throttle position sensor 38.

Figure 2:
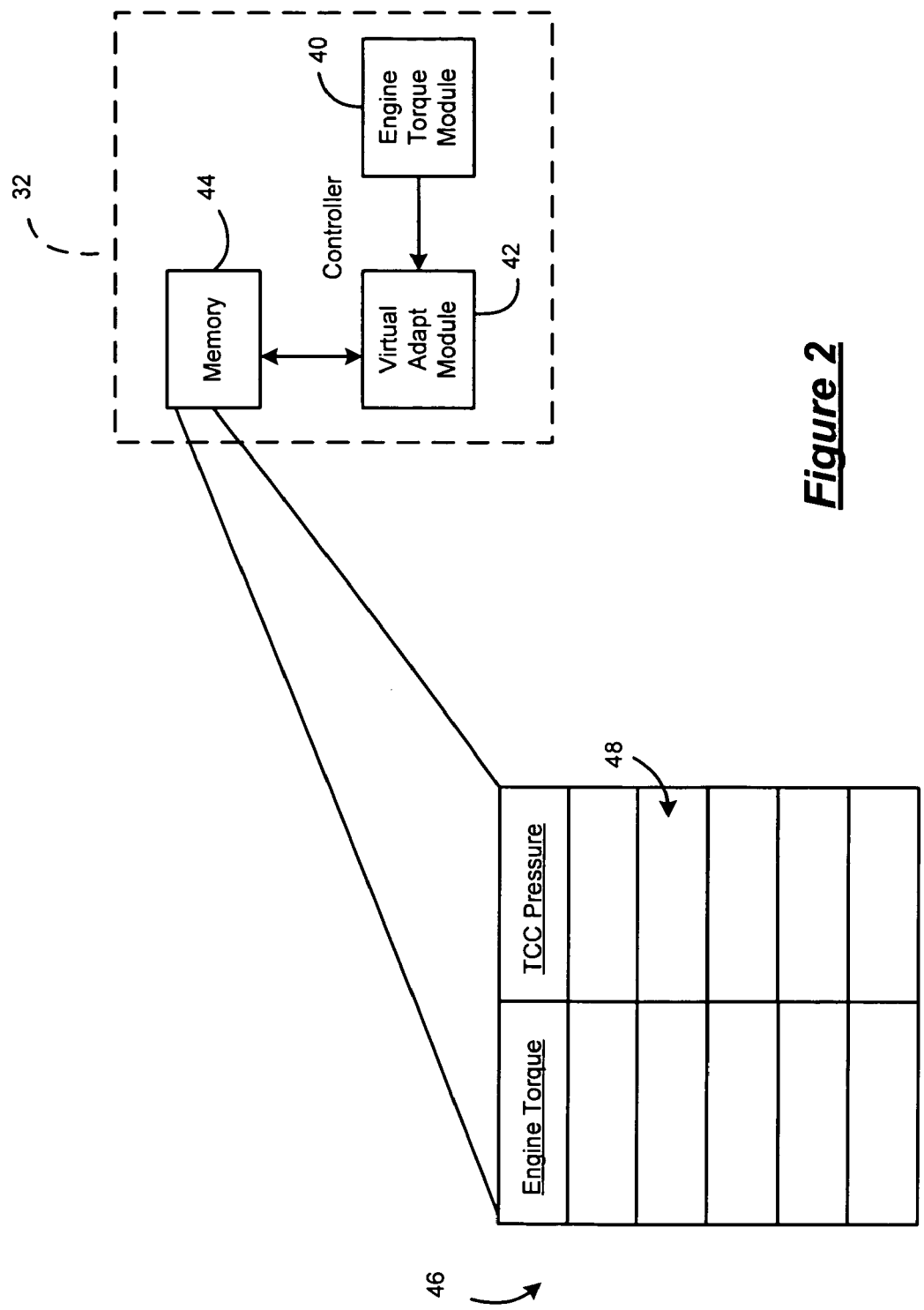
FIG. 2 is a block diagram illustrating a controller.

Referring now to FIG. 2, in various embodiments the controller 32 includes an engine torque module 40 and a virtual adapt module 42. The engine torque module 40 determines an engine torque value based on engine operating parameters. The virtual adapt module 42 learns TCC adaptive pressure values per selected engine torque values and stores them in memory 44. The memory 44 may be of a non-volatile type memory. The adaptive pressure values are stored in a table 46 defined by engine torque as the index. More specifically, the virtual adapt module 42 stores TCC adapt pressure values in cells 48 of the table 46 that correspond to the appropriate engine torque value. The learned adapt values are later retrieved from the cells 50 of the table 48 in order to control pressurized fluid to the torque converter.

Figure 3A:
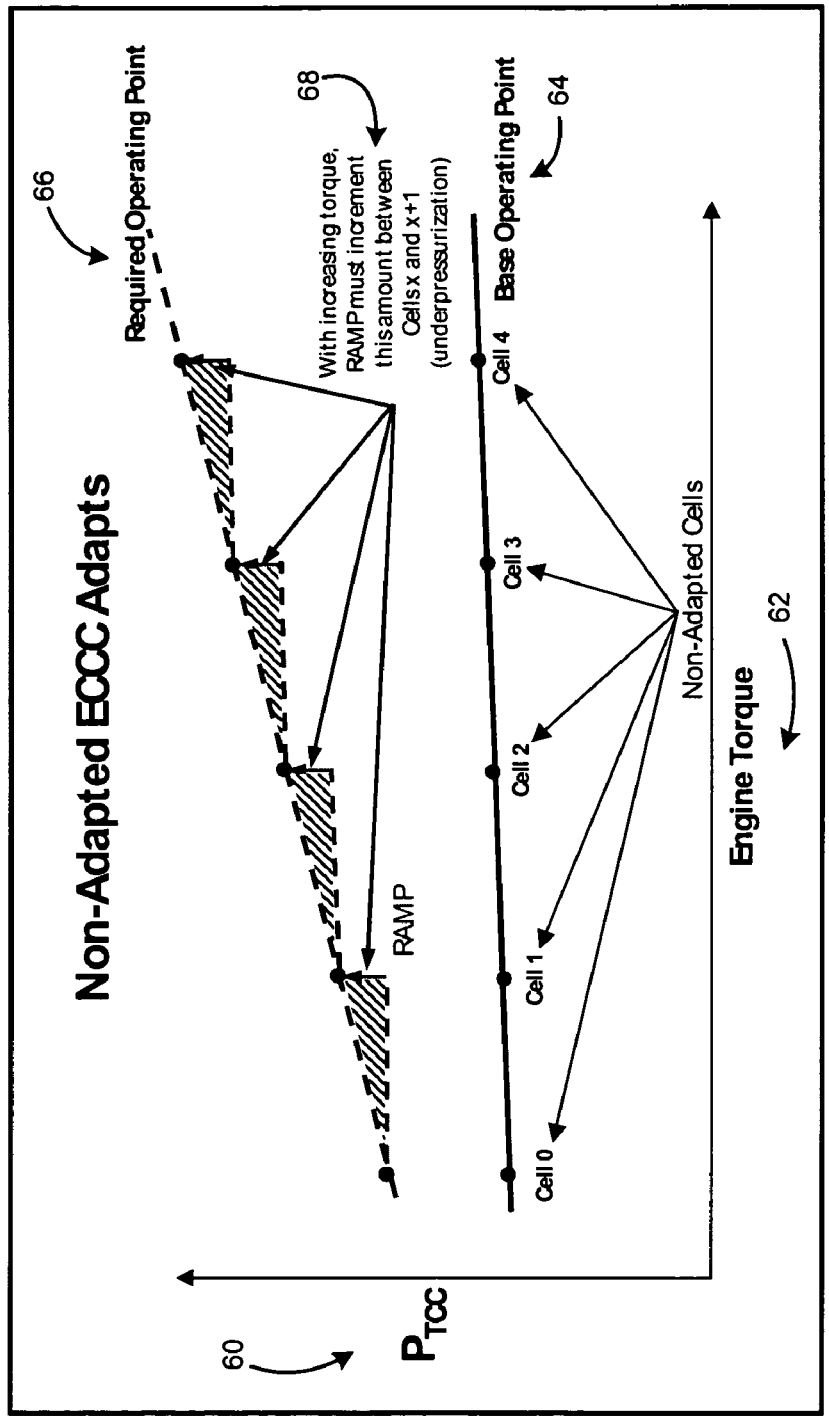
FIG. 3A is a graph illustrating non-adapted electronically controlled torque converter clutch (ECCC) cells.
Figure 3B:
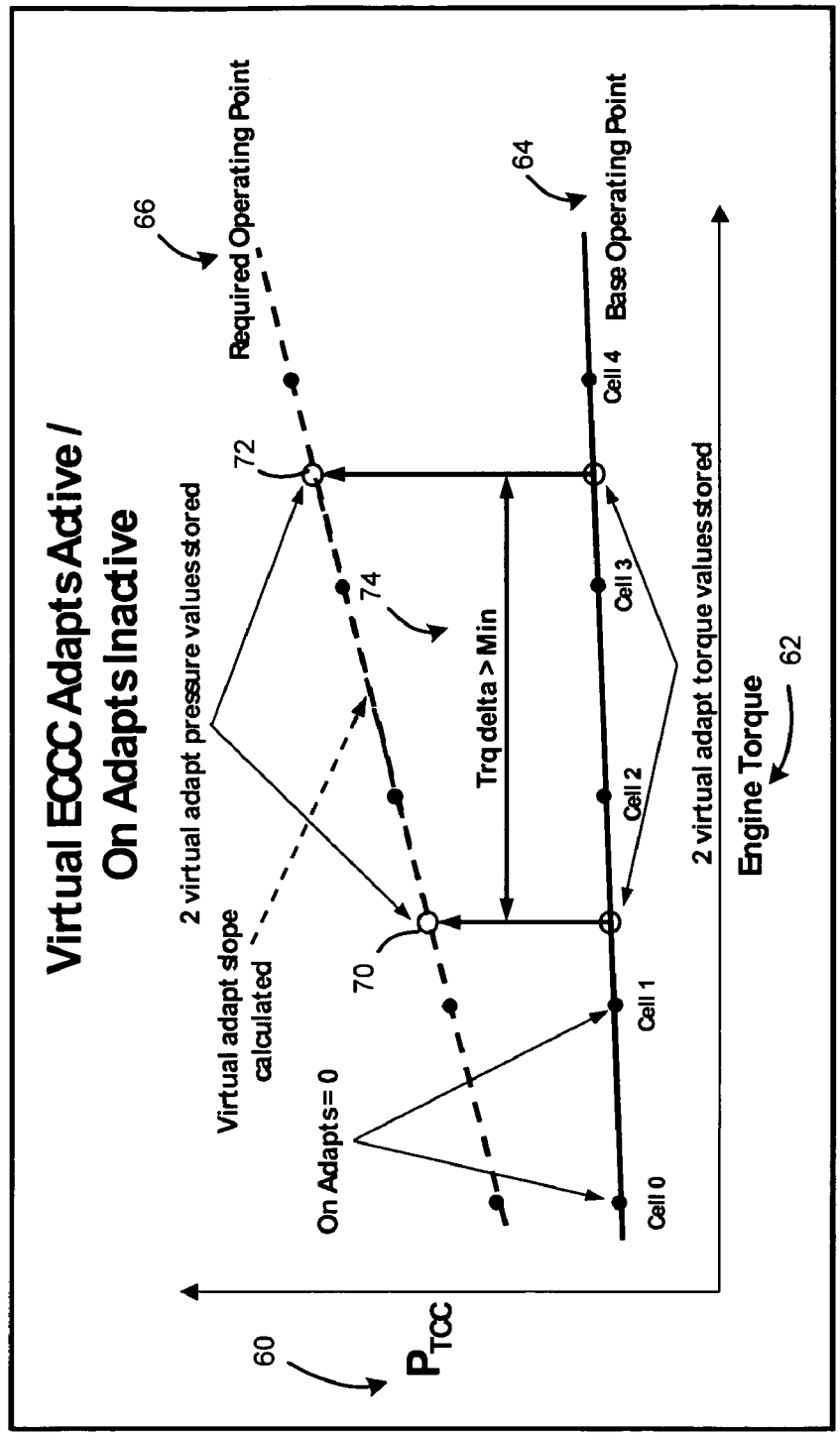
FIG. 3B is a graph illustrating virtual ECCC adapt cells.
Figure 3C:
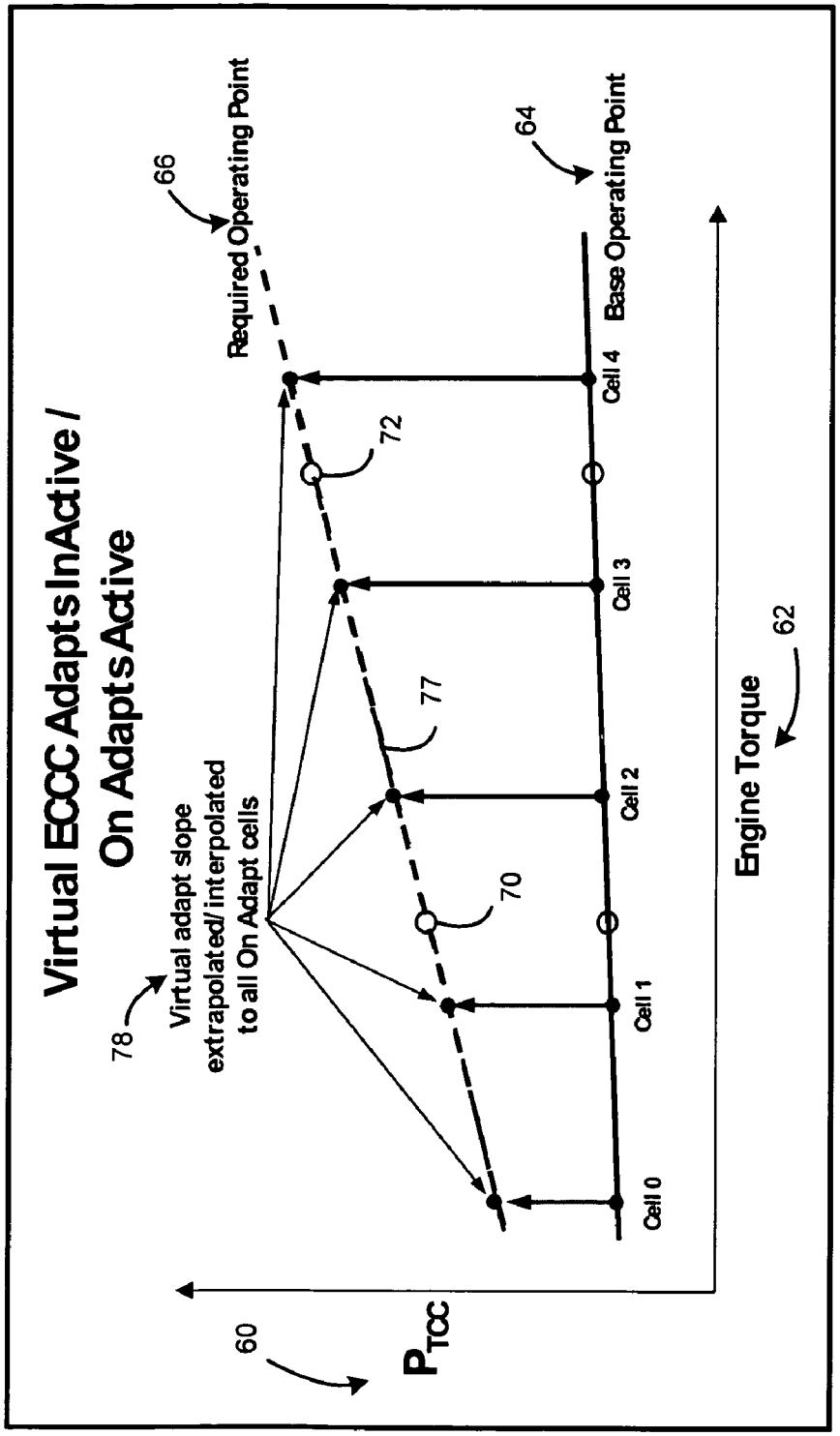
FIG. 3C is graph illustrating adapted ECCC cells.

The virtual adapt module 42, more specifically, implements a method which quickly learns the adapt values in a virtual manner. The learned values are not applied to the TCC pressure control until all cells of the table are filled. FIGS. 3A-C illustrate the method implemented by the virtual adapt module 42. In FIG. 3A, TCC pressure ($P_{TCC}$) is represented along the y-axis at 60. Engine torque is represented along the x-axis at 62. Non-adapted cells 0-4 are initialized to a value. This value is typically zero. The line labeled as the "base operating point" at 64 illustrates the base TCC pressure values calculated from engine torque. The required pressure values for TCC operation per engine torque is illustrated by the line labeled "required operating point" at 66. The required operating point equals the base operating point value plus a ramp pressure plus the adapted value. In order to achieve the required pressure values when the adapt cells are not yet filled and the engine torque is increasing, a value labeled "RAMP" is added to the preceding cell value at 68. This allows pressure to be supplied at a predetermined RAMP rate when the cell values are not yet adapted.

Referring to FIG. 3B, according to the virtual adapt learn method, all cell values are adapted by learning the error in the system (RAMP) at a single point 70 independent of the adapt cell torque increments. The learned values are stored in a first virtual adapt cell. A second point 72 is then learned at a minimum distance (engine torque delta 74) from the first point 70. The second learned value is stored in a second virtual adapt cell. Referring to FIG. 3C, once the second point is learned, all of the adapt cell values are calculated by determining the line 77 between the two points 70 and 72 and then interpolating and extrapolating appropriately to fill the adapt cells (cells 0-4) with the appropriate value. Once the adapt cells (cells 0-4) are filled, they can be used by the TCC control system to control pressure to the TCC.

Figure 4:
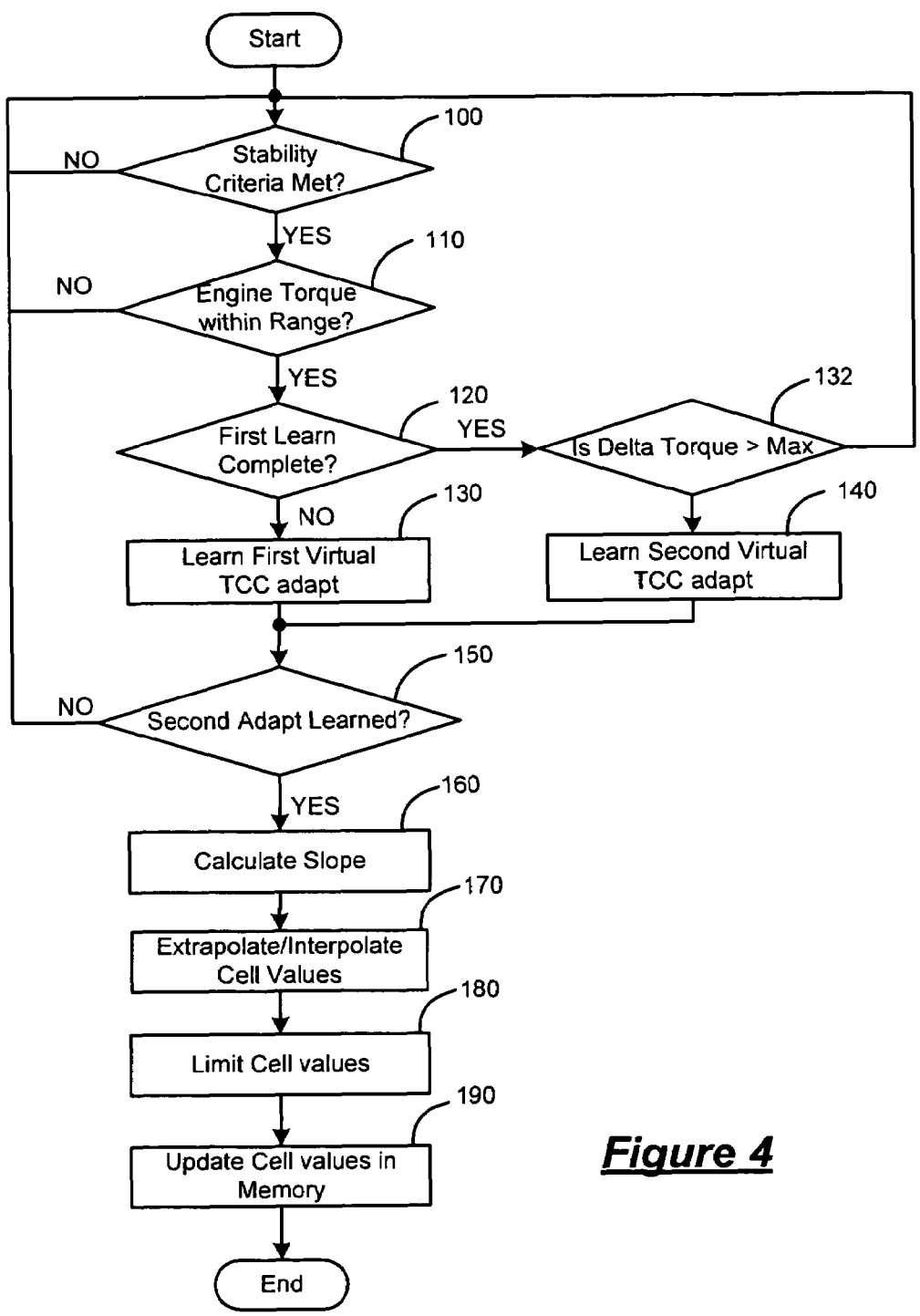
FIG. 4 is a flowchart illustrating an embodiment of the torque converter virtual adapt learn method.

Referring to FIG. 4, a flowchart illustrates an exemplary embodiment of the TCC virtual adapt learn method implemented by the virtual adapt module 42 of FIG. 2. The method may be run if the adapt values are all at an initial value (i.e., when first functioning and after an adapt reset). In FIG. 4, TCC on adapt stability criteria are monitored at 100. The criteria may include: whether the engine torque is stable; whether the throttle position is stable; whether the slip error is stable; whether ECCC is On; and whether a shift is not in progress. If the stability criteria are met control evaluates engine torque at 110. Otherwise control continues to monitor the stability criteria at 100. If engine torque is within a predetermined range at 110, a first virtual adapt cell is learned at 120. Otherwise control loops back and continues to monitor stability criteria at 100. The first virtual adapt cell is learned by averaging both TCC ramp pressure and engine torque for a specified time and then storing those values in virtual (temporary) adaptive cells.

Once the first virtual adapt has been stored at 130, control loops back and monitors the stability criteria at 100. If the stability criteria are met at 100, if engine torque is within the predetermined range at 110, and the first learn is complete at 120, a change in torque is evaluated at 132. If the change in torque is greater than or equal to a predetermined maximum delta torque from the first stored engine torque, the second virtual adapt cell is learned at 140. The second virtual adapt cell is learned by averaging both ramp pressure and engine torque for a specified time and then storing those values in the second virtual (temporary) adapt cell.

Once this second virtual adapt is complete, a line is interpolated between the two virtual adapt cells at 160. The slope (m) of that line is determined by the following equation:

$$\text{slope}(m) = \frac{\text{VirtualRamp}^2 - \text{VirtualRamp}^1}{\text{VirtualTorque}^2 - \text{VirtualTorque}^1} \quad (1)$$

Where VirtualRamp$^1$ is the average RAMP pressure of the first learned virtual adapt. VirtualRamp$^2$ is the average RAMP pressure of the second learned virtual adapt. VirtualTorque$^1$ is the average engine torque of the first learned virtual adapt. VirtualTorque$^2$ is the average engine torque of the second learned virtual adapt with slope m through the two learned points.

Once the slope (m) is determined at 160, the other adapt cells can be determined from the line. The adapt cell value (x) is determined by the following equation:

AdaptCell(x)value=[m●(AdaptCell(x)Torque−VirtualTorque$^1$)]+VirtualRamp$^1$ (2)

Where AdaptCell(x)value represents the adapt values for x cell. m is the slope of the virtual adapt line. AdaptCell(x) Torque is the specified adapt cell engine torque. VirtualTorque$^1$ is the average torque value learned into the first virtual adapt engine torque cell. VirtualRamp$^1$ is the average ramp value learned into the first virtual adapt ramp cell.

The cell values calculated by the above equation (2) must be limited at 180 by predetermined maximum and minimum values so as to protect against abnormally large values being placed in the adapt cells. The values are limited at 180 and stored in memory at 190.

It can be appreciated that all comparisons made in various embodiments of FIG. 4 can be implemented in various forms depending on the selected values for the maximum and the range. For example, a comparison of "greater than" may be implemented as "greater than or equal to" in various embodiments. Similarly, a comparison of "within range" may be implemented as "less than or equal to a maximum" and "greater than or equal to a minimum" or as "less than a maximum" and "greater than a minimum" in various embodiments.

Those skilled in the art can now appreciate from the foregoing description that the broad teachings of the present disclosure can be implemented in a variety of forms. Therefore, while this disclosure has been described in connection with particular examples thereof, the true scope of the disclosure should not be so limited since other modifications will become apparent to the skilled practitioner upon a study of the drawings, specification, and the following claims.

What is claimed is:

1. A method of adapting a pressurized fluid supply to a torque converter clutch, comprising:
   learning a first pressure point related to an average ramp pressure and an average engine torque over a first time period;
   learning a second pressure point related to a second average ramp pressure and a second average engine torque over a second time period;
   determining a plurality of adapt values based on at least one of an extrapolation and an interpolation between the first pressure point and the second pressure point; and
   adapting the pressurized fluid to the torque converter clutch based on the plurality of adapt values.

2. The method of claim 1 wherein the determining comprises:
   calculating a slope (m) based on the first pressure point and the second pressure point;
   defining a line based on the slope and at least one of the first pressure point and the second pressure point;
   interpolating and extrapolating a plurality of points from the line; and
   storing the plurality of points in memory as the plurality of adapt values.

3. The method of claim 1 wherein the learning the second pressure point occurs after a change in engine torque is greater than a predetermined maximum delta.

4. The method of claim 2 wherein the storing the plurality of points comprises storing the plurality of points in a table including a plurality of cells, wherein the table is indexed by engine torque and the related pressure is stored in the cells.

5. The method of claim 1 wherein the learning the first pressure point and the learning the second pressure point is performed when engine stability criteria are met.

6. The method of claim 1 further comprising limiting the values of the plurality of pressure points to be within a predetermined maximum and a predetermined minimum.

7. The method of claim 2 wherein the slope (m) is calculated from the average ramp pressure for the first pressure point (VirtualRamp$^1$), the second average ramp pressure for the second pressure point (VirtualRamp$^2$), the average engine torque for the first pressure point (VirtualTorque$^1$), the second average engine torque for the second pressure point (VirtualTorque$^2$), and based on an equation:

$$\text{slope}(m) = \frac{VirtualRamp^2 - VirtualRamp^1}{VirtualTorque^2 - VirtualTorque^1}.$$

8. The method of claim 2 wherein the interpolating and extrapolating can be performed based on the slope (m), the average ramp pressure for the first pressure point (VirtualRamp$^1$), the average engine torque for the first pressure point (VirtualTorque$^1$), a selected engine torque (AdaptCell(x)Torque), and based on an equation:

AdaptCell(x)value=[m●(AdaptCell(x)Torque−VirtualTorque$^1$)]+VirtualRamp$^1$.

9. The method of claim 2 wherein the plurality of points are stored in non-volatile memory.

10. The method of claim 2 further comprising adapting the pressurized fluid to the torque converter clutch based on ramp pressure until all of the plurality of points are stored.

11. A torque converter clutch control system for a vehicle including an automatic transmission, comprising:
    at least one valve that controls the flow of pressurized fluid to the torque converter;
    at least one solenoid that controls a position of the at least one valve; and
    a controller that sends a signal to the solenoid based on a pressure value, wherein the pressure value is adapted based on an adapt value determined from first and second operating points that are learned by averaging ramp pressure and engine torque over a first and second time periods and a slope value calculated from the first and second operating points.

12. The system of claim 11 wherein the slope (m) is determined from the average ramp pressure for the first time period (VirtualRamp$^1$), the average ramp pressure for the second time period (VirtualRamp$^2$), the average engine torque for the first time period (VirtualTorque$^1$), the average engine torque for the second time period (VirtualTorque$^2$), and based on an equation:

$$\text{slope}(m) = \frac{VirtualRamp^2 - VirtualRamp^1}{VirtualTorque^2 - VirtualTorque^1}.$$

13. The system of claim 11 wherein the adapt value is determined by at least one of interpolating and extrapolating a value from the first and second operating points.

14. The system of claim 11 wherein the adapt value is determined from the slope (m), the average ramp pressure for the first time period (VirtualRamp$^1$), the average engine torque for the first time period (VirtualTorque$^1$), a selected engine torque (AdaptCell(x)Torque), and based on an equation:

AdaptCell(x)value=[m●(AdaptCell(x)Torque−VirtualTorque$^1$)]+VirtualRamp$^1$.

15. The system of claim 11 wherein the adapt value is limited to be within a predetermined maximum and a predetermined minimum.

16. The system of claim 11 wherein the controller includes non-volatile memory and wherein the adapt value is stored in and retrieved from the non-volatile memory.

17. The system of claim 11 wherein the controller determines the adapt value when engine stability criteria are met.

18. The system of claim 17 wherein the engine stability criteria are based on at least one of engine speed, throttle position, shift status, status of a torque converter clutch, turbine speed, and engine torque.

19. The system of claim 11 wherein the second time period begins at a time where a change in engine torque is greater than a predetermined maximum delta.

20. The system of claim 11 wherein a plurality of adapt pressure values are stored in a table indexed by engine torque.

21. The system of claim 11 wherein the pressure value is adapted based on ramp pressure until the adapt value is determined.

* * * * *